(12) United States Patent  (10) Patent No.: US 7,929,278 B2
Watanabe et al.  (45) Date of Patent: Apr. 19, 2011

(54) ELECTRONIC EQUIPMENT

(75) Inventors: Takaaki Watanabe, Yokohama (JP);
Mamoru Tsumuraya, Yokohama (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 12/524,464

(22) PCT Filed: Jan. 24, 2008

(86) PCT No.: PCT/JP2008/051007
§ 371 (c)(1),
(2), (4) Date: Jan. 26, 2010

(87) PCT Pub. No.: WO2008/090964
PCT Pub. Date: Jul. 31, 2008

(65) Prior Publication Data
US 2010/0128421 A1    May 27, 2010

(30) Foreign Application Priority Data
Jan. 24, 2007  (JP) ................................ 2007-013663

(51) Int. Cl.
*G06F 1/16* (2006.01)
(52) U.S. Cl. ............. 361/679.01; 455/575.1; 297/284.4; 345/169
(58) Field of Classification Search ................... 297/316, 297/284.3, 284.4, 411.36; 248/183.3, 242, 248/349.1; 345/169; 455/575.1, 575.3; 361/679.01, 361/679.27, 679.43, 679.28, 679.57, 679.58
See application file for complete search history.

(56) References Cited

U.S. PATENT DOCUMENTS

| | | | |
|---|---|---|---|
| 6,583,985 B2* | 6/2003 | Nguyen et al. | 361/679.27 |
| 2005/0037821 A1 | 2/2005 | Takagi | 455/575.3 |
| 2005/0099533 A1* | 5/2005 | Matsuda et al. | 348/375 |
| 2008/0080919 A1* | 4/2008 | Rak et al. | 400/486 |
| 2008/0311963 A1* | 12/2008 | Strawn | 455/575.1 |

FOREIGN PATENT DOCUMENTS

| | | |
|---|---|---|
| JP | 04-273365 | 9/1992 |
| JP | 2003-229941 | 8/2003 |
| JP | 2003-336620 | 11/2003 |
| JP | 2005-052979 | 3/2005 |
| JP | 2005-064931 | 3/2005 |
| JP | 2005-277600 | 10/2005 |
| JP | 2005-286429 | 10/2005 |

* cited by examiner

*Primary Examiner* — Hung V Duong
(74) *Attorney, Agent, or Firm* — DLA Piper LLP (US)

(57) ABSTRACT

An electronic equipment having a mechanism which, when a display unit side housing and an operation unit side housing are closed together, holds the housings without rattle. The electronic equipment has a first housing, a second housing provided on the first housing so as to be rotatable about a first pivot axis, and a third housing provided on the second housing so as to be rotatable about a second pivot axis substantially perpendicular to the first pivot axis. In order that the third housing tilts toward the first housing when the third housing is closed on the first housing, a flat surface perpendicular to the second pivot axis is constructed so as to form a predetermined angle relative to a flat surface of the first housing facing the third housing.

9 Claims, 9 Drawing Sheets

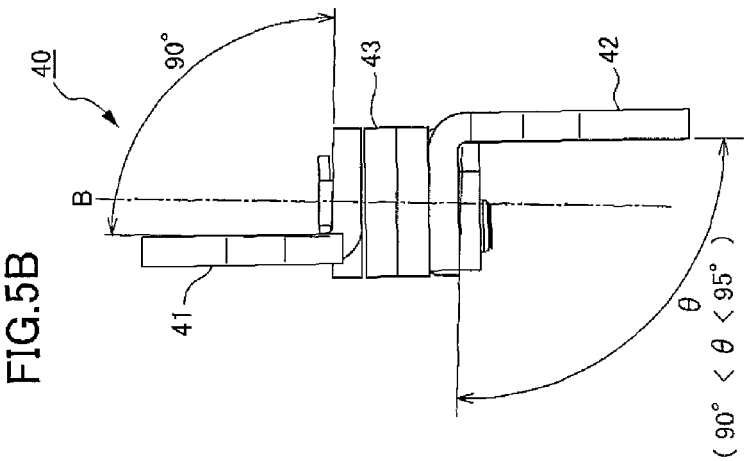
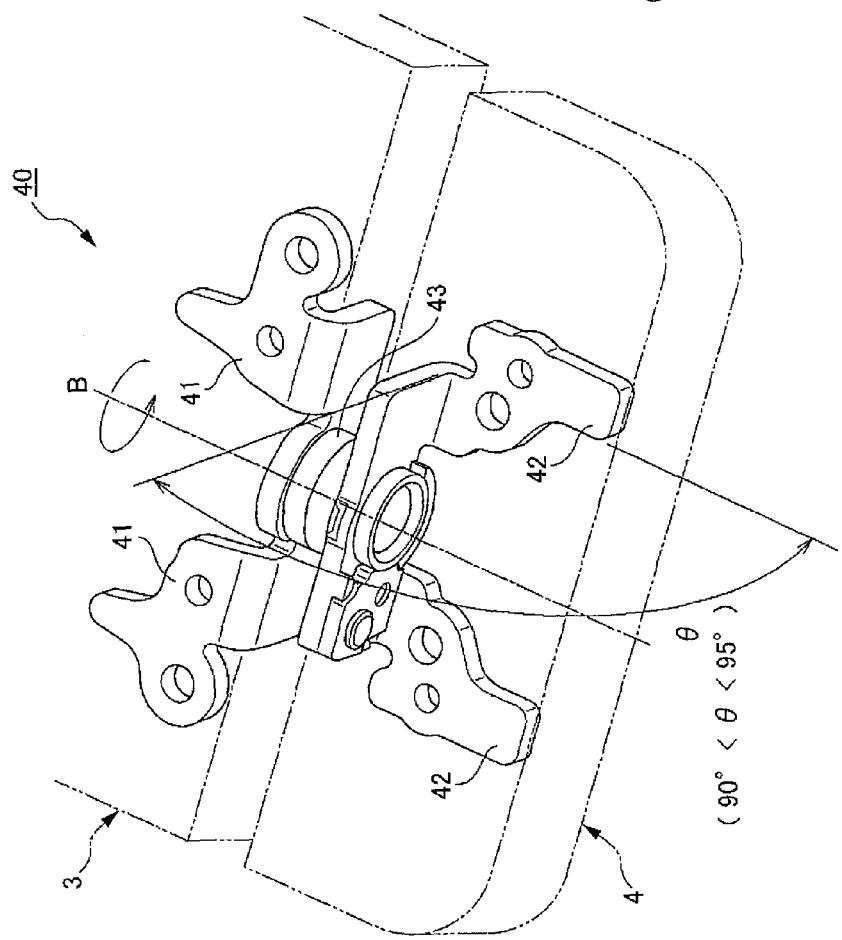

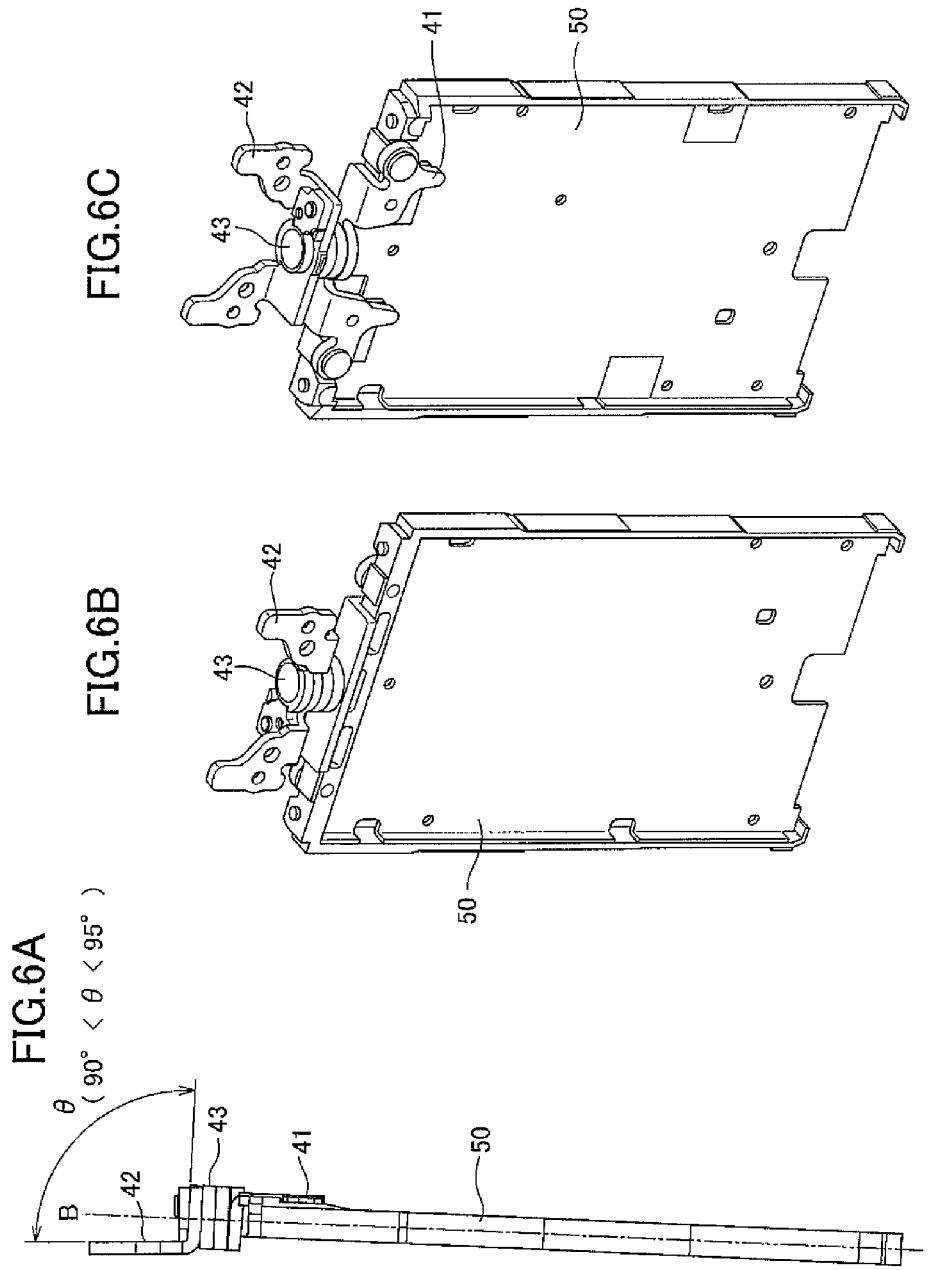

under 35 USC §119 to
ELECTRONIC EQUIPMENT

CROSS-REFERENCE TO THE RELATED APPLICATIONS

This application is a national stage of international application No. PCT/JP2008/051007 filed on Jan. 24, 2008, which also claims the benefit of priority under 35 USC §119 to Japanese Patent Application No. 2007-013663 filed on Jan. 24, 2007, the entire contents of which are incorporated herein by reference.

TECHNICAL FIELD

The present invention relates to an electronic equipment that is provided with a plurality of housings pivotally connected via two pivot axes that are substantially orthogonal to each other.

BACKGROUND ART

A mobile terminal device is configured with a display unit side housing and an operation unit side housing which are connected by a hinge portion, and has a structure in which a main display of the display unit side housing and operation keys of the operation unit side housing are exposed by pivoting thereof about the hinge portion to make an opened state.

Moreover, in such a mobile terminal device, a mode is provided in which the main display of the display unit side housing can be exposed, even in a closed state. In such a mode, the hinge portion is configured integrally with an opening-and-closing axis, which opens and closes the display unit side housing and the display unit side housing, and a pivot axis, which pivots the display unit side housing in a direction orthogonal to the opening-and-closing axis (e.g., Patent Documents 1 to 3).

[Patent Document 1] Japanese Unexamined Patent Application, First Publication No. 2003-336620

[Patent Document 2] Japanese Unexamined Patent Application, First Publication No. 2005-064931

[Patent Document 3] Japanese Unexamined Patent Application, First Publication No. 2005-286429

DISCLOSURE OF THE INVENTION

Problems to be Solved by the Invention

Incidentally, a conventional mobile terminal device employing a 2-axis hinge may rattle in some cases when the display unit side housing and the operation unit side housing are pivoted to close about the opening-and-closing axis. This rattle is caused by an assembly error arising at the time of manufacturing resulting in an unexpected angle between the hinge mechanism portion and the display unit side housing, and this angle causes the edges to be separated when the display unit side housing and the operation unit side housing are closed.

The present invention has been made in view of the aforementioned problem, and an object thereof is to provide an electronic equipment having a mechanism to hold the housings tightly so as to suppress the rattling thereof.

Means for Solving the Problems

In order to solve the aforementioned problem, the electronic equipment according the present invention includes: a first housing; a second housing that is provided to pivot freely about a first pivot axis in relation to the first housing; and a third housing, which is provided to pivot freely about a second pivot axis that is substantially orthogonal to the first pivot axis in relation to the second housing, and which takes a state facing and a state not facing the first housing, in which, in a case in which the third housing is in a state facing the first housing, the third housing is configured so as to have a flat surface, which is orthogonal to the second axis, and which makes a predetermined angle in relation to a flat surface of the first housing that faces the third housing so that the third housing tilts in relation to the first housing.

In addition, in the electronic equipment, a configuration is preferable in which the second pivot axis tilts in relation to the second housing.

Moreover, in the electronic equipment, a configuration is preferable in which a first holding portion is formed on one or both an edge of the first housing and an edge of the third housing that are not connected to the second housing, and in a case in which the third housing is in a state facing the first housing about the first pivot axis, the edge of the first housing and the edge of the third housing are held by the first holding portion.

Furthermore, in the electronic equipment, a configuration is preferable in which a second holding portion is formed on the first housing in the vicinity of a connecting portion thereof to the second housing, and in a case in which the third housing is in a state facing the first housing about the first pivot axis, a portion of connecting the second housing and the third housing is held by the second holding portion.

In addition, in the electronic equipment, a configuration is preferable in which the predetermined angle is an angle of greater than 90 degrees.

Moreover, in the electronic equipment, it is preferable for the first holding portion to be a convex portion.

Furthermore, in the electronic equipment, it is preferable for the second holding portion to be a convex portion.

In addition, in the electronic equipment, a configuration is preferable in which the first holding portion restricts movement of the first housing and the third housing at least in a direction substantially parallel to the first pivot axis.

Moreover, in the electronic equipment, a configuration is preferable in which the second holding portion restricts movement of the first housing and the second housing at least in a direction substantially parallel to the first pivot axis.

EFFECTS OF THE INVENTION

According to the electronic equipment of the present invention, it is possible to hold the housing tight without rattling.

BRIEF DESCRIPTION OF THE DRAWINGS

FIG. 5 is a view showing a structure of a pivoting connecting member provided in a connecting portion of the mobile terminal device according to the present invention;

FIG. 6 is a view showing an appearance when the pivoting connecting member shown in FIG. 5 is fixed to a shielding case and a hinge case;

PREFERRED MODE FOR CARRYING OUT THE INVENTION

An embodiment of the present invention is hereinafter described with reference to the drawings.

Figure 1:
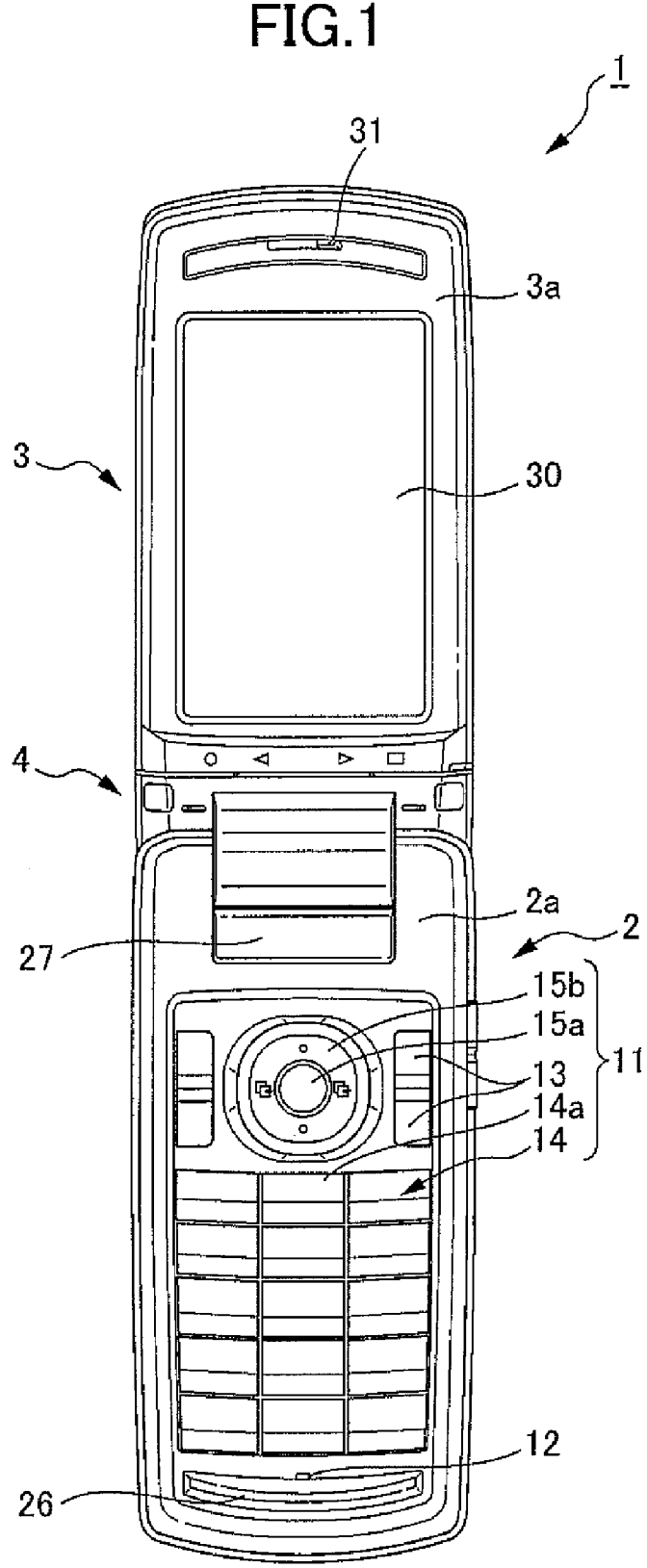
FIG. 1 is a front view of a state in which a mobile terminal device according to the present invention is open.

FIG. 1 shows a front view of a state (opened state) in which a mobile terminal device 1 as an electronic equipment is open. Moreover, FIG. 2 (A) shows a left side view of a state in which the mobile terminal device 1 is open, and FIG. 2 (B) shows a right side view of a state in which the mobile terminal device 1 is open. Furthermore, FIG. 3 shows a rear view of a state in which the mobile terminal device 1 is open.

Overview

The mobile terminal device 1 includes an operation unit side housing (first housing) 2 and a display unit side housing (third housing) 3. The operation unit side housing 2 and the display unit side housing 3 are connected by a 2-axis hinge mechanism, with which the mobile terminal device 1 can be made into the opened state (open) and a closed state (close), and in each of the opened state and the closed state, the operation unit side housing 2 can be switched between a turned-and-opened state (turn-and-open) and a turned-and-closed state (turn-and-close).

Here, the closed state is a state in which both housings are disposed so as to be mutually superimposed, and the opened state is a state in which both housings are disposed so as not to be mutually superimposed. The turned-and-opened state is a state in which a surface, on which a display 30 (to be described later) in the display unit side housing 3 is disposed, and a surface, on which an operation key set 11 in the operation unit side housing 2 is disposed, are disposed so as to face the same side. The turned-and-closed state is a state in which the surface in the operation unit side housing 2 and the surface in the display unit side housing 3 are disposed so as to face the opposite sides.

An outer surface of the operation unit side housing 2 is configured with a front panel 2a and a rear panel 2b. The operation unit side housing 2 is configured such that the operation key set 11 and a sound input unit 12, into which sound produced by the user of the mobile terminal device 1 during a conversation is input, are exposed on the front panel 2a side, which is a front surface. Here, the operation key set 11 is configured with: function setting operation keys 13 for operating various functions such as for various settings, a telephone number directory function and a mail function; input operation keys 14 such as ten keys for inputting digits of a telephone number and characters for mail (14a denotes a clear key); a selection key 15a for performing selection of the various operations; and a cross key 15b (up-down direction operation key, left-right direction operation key) for scrolling up and down or scrolling left and right. Moreover, the operation unit side housing 2 has formed therein a first convex portion 26 and a second convex portion 27, described later in detail.

In addition, predetermined functions are assigned (key assignment) to each key configuring the operation key set 11 in accordance with an opened/closed state or a transformation state such as a rotation state of the operation unit side housing 2 and the display unit side housing 3, and the type of application that is running. An operation corresponding to a function assigned to each key is executed by a user depressing each key configuring the operation key set 11 of the mobile terminal device 1.

Figure 2A:
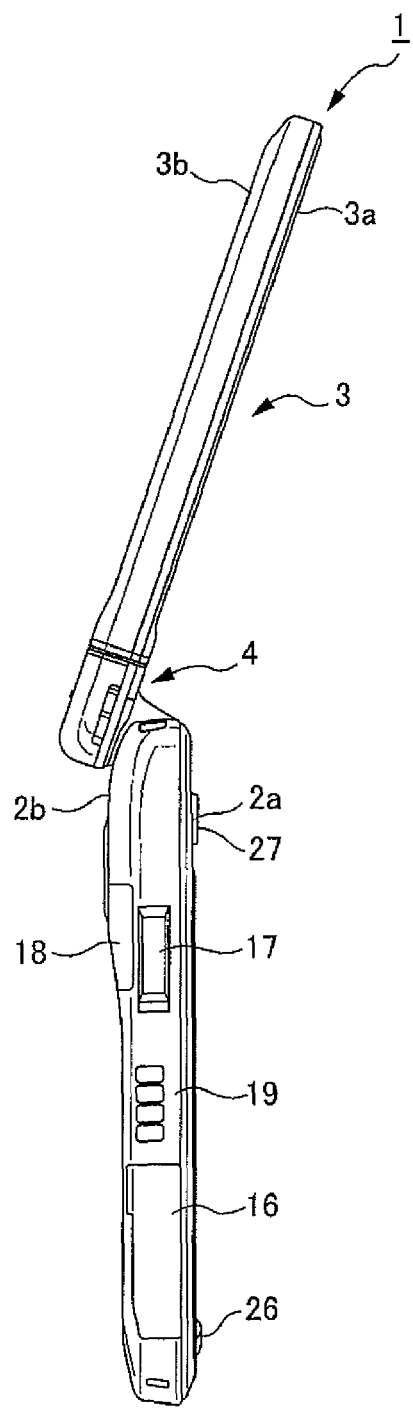
FIG. 2 is a lateral view of a state in which the mobile terminal device according to the present invention is open.
Figure 3:
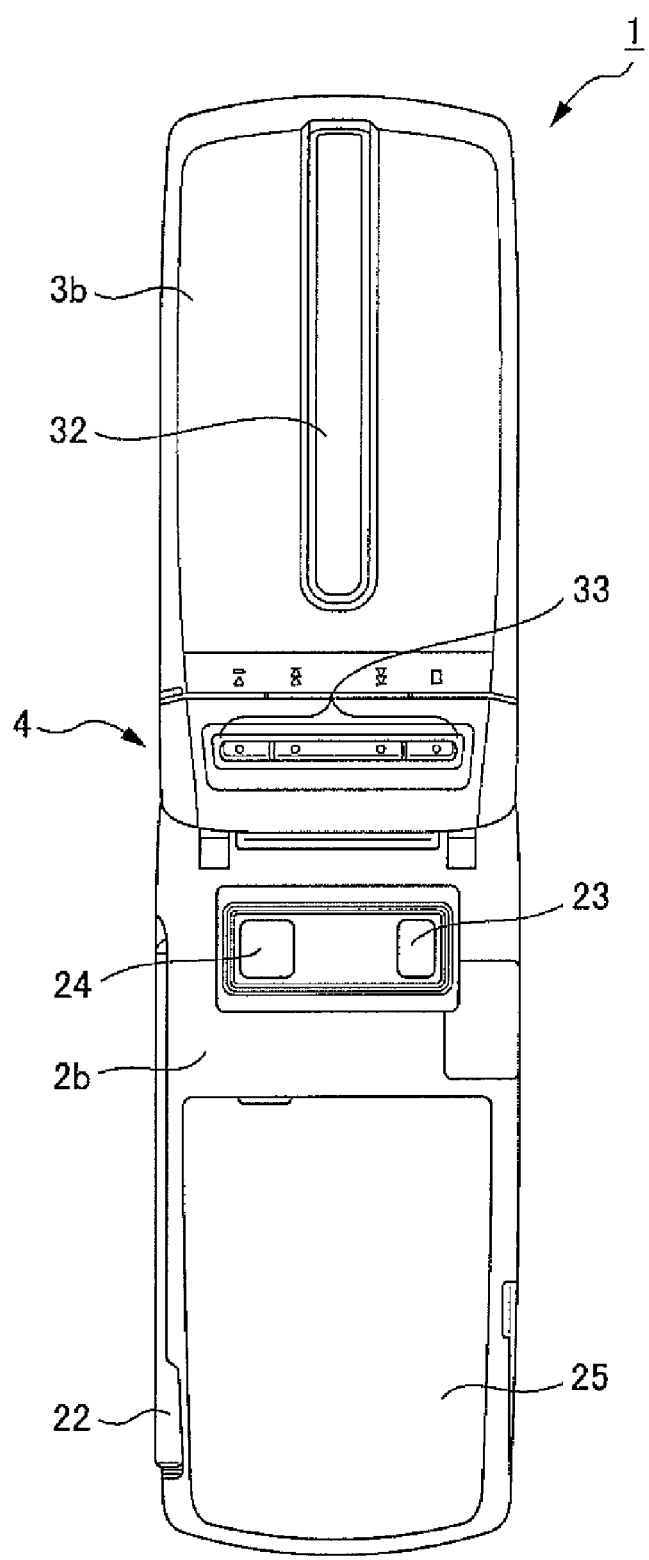
FIG. 3 is a rear view of a state in which the mobile terminal device according to the present invention is open.

Moreover, as shown in FIG. 2(A), an interface 16 for sending and receiving data with an external device (e.g., a host device), a headphone/microphone terminal 17, a detachable external memory interface 18, and a charging terminal 19 for recharging a battery that is not shown are provided on one side of the operation unit side housing 2. It should be noted that the interface 16, the headphone/microphone terminal 17 and the interface 18 are covered with a detachable dust-proof cap when not in use.

Figure 2B:
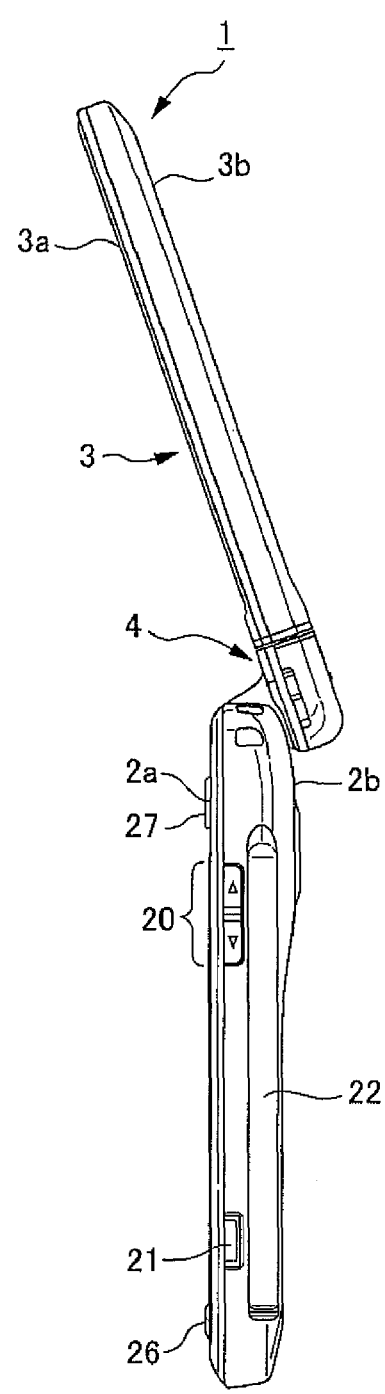

Furthermore, as shown in FIG. 2(B), a pair of side keys (first operation keys) 20, an operation key 21 used when capturing an image, and an antenna 22 for receiving a broadcast wave, in which an reception angle of waves can be adjusted, are provided on another side of the operation unit side housing 2. Predetermined functions are assigned to the side keys 20 in accordance with an opened/closed state or transformation state such as rotation state of the operation unit side housing 2 and the display unit side housing 3, and the type of application that is running. Here, similarly to the aforementioned case, an operation corresponding to a function assigned to the side keys 20 is executed by a user depressing the side keys 20 of the mobile terminal device 1.

In addition, as shown in FIG. 3, a camera unit 23 that takes an image of a subject and a light unit 24 that irradiates light on the subject are formed so as to be exposed in the rear panel 2b, which is a rear surface of the operation unit side housing 2. A battery lid 25 as a cover for covering a battery accommodating portion that detachably accommodates a battery is provided on the rear panel 2b of the operation unit side housing 2.

Furthermore, as shown in FIGS. 1 to 3, an upper end portion of the operation unit side housing 2 and a lower end portion of the display unit side housing 3 are connected by a connecting portion 4 that includes a 2-axis hinge mechanism. As shown in FIG. 3, a secondary operation key set 33 is disposed on a rear surface side of the connecting portion 4 in a row in a width direction (lateral direction) in the mobile terminal device 1. Predetermined functions are assigned (key assignment) to each key configuring the secondary operation key set 33 in accordance with an opened/closed state or transformation state such as a rotation state of the operation unit side housing 2 and the display unit side housing 3, and the type of application that is running. An operation corresponding to a function assigned to each key is executed by a user depressing each key configuring the secondary operation key set 33 of the mobile terminal device 1.

An outer surface of the display unit side housing 3 is configured with a front panel 3a and a rear panel 3b. The display 30 of a predetermined shape for displaying a variety of information and a sound output unit 31 that outputs sound of the other party of the conversation are configured so as to be exposed on the front panel 3a, which is a front surface side of the display unit side housing 3.

In addition, a sub-display 32 of a predetermined shape for displaying a variety of information is disposed so as to be exposed on the rear panel 3b, which is a rear surface side of the display unit side housing 3.

Each of the display 30 and the sub-display 32 is configured with a liquid crystal display panel, a drive circuit that drives the liquid crystal display panel, and a light source unit such as a backlight that irradiates light from the back surface side of the liquid crystal display panel.

The display unit side housing 3 is connected to the operation unit side housing 2 so as to enable switching between a closed state and a turned-and-closed state.

Structure

Figure 4:
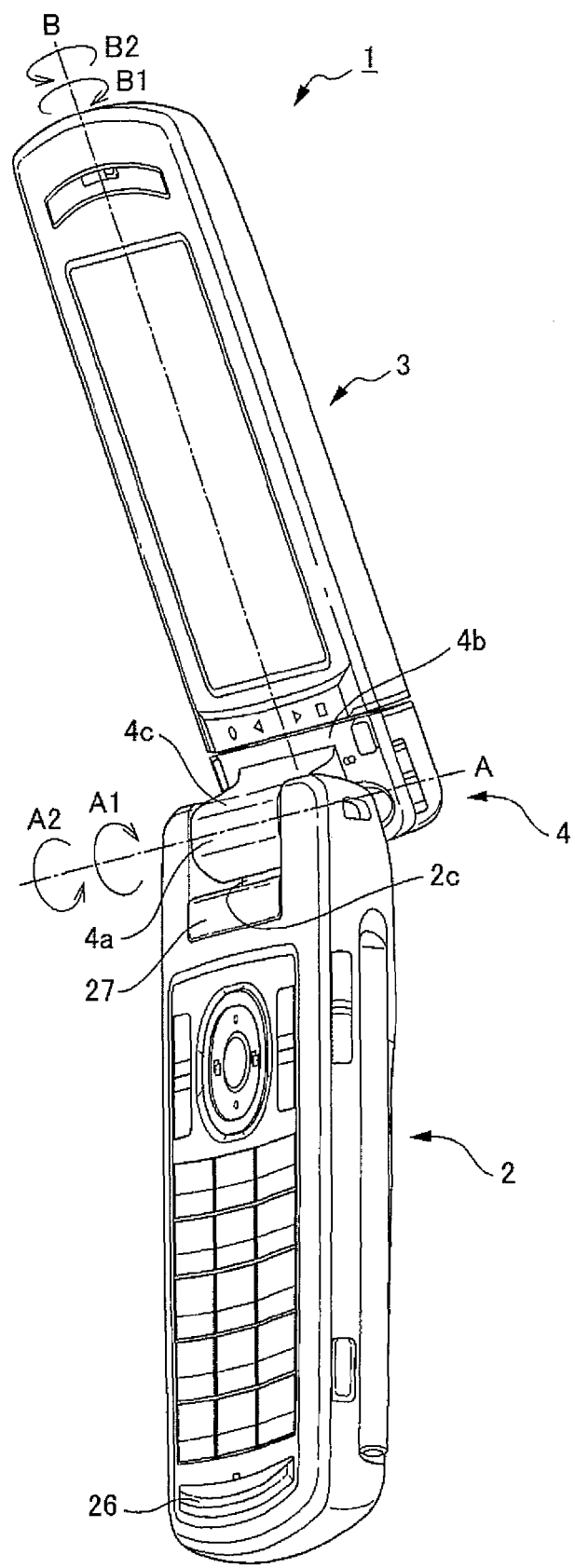
FIG. 4 is a perspective view of a state in which the mobile terminal device according to the present invention is open.
Figure 7:
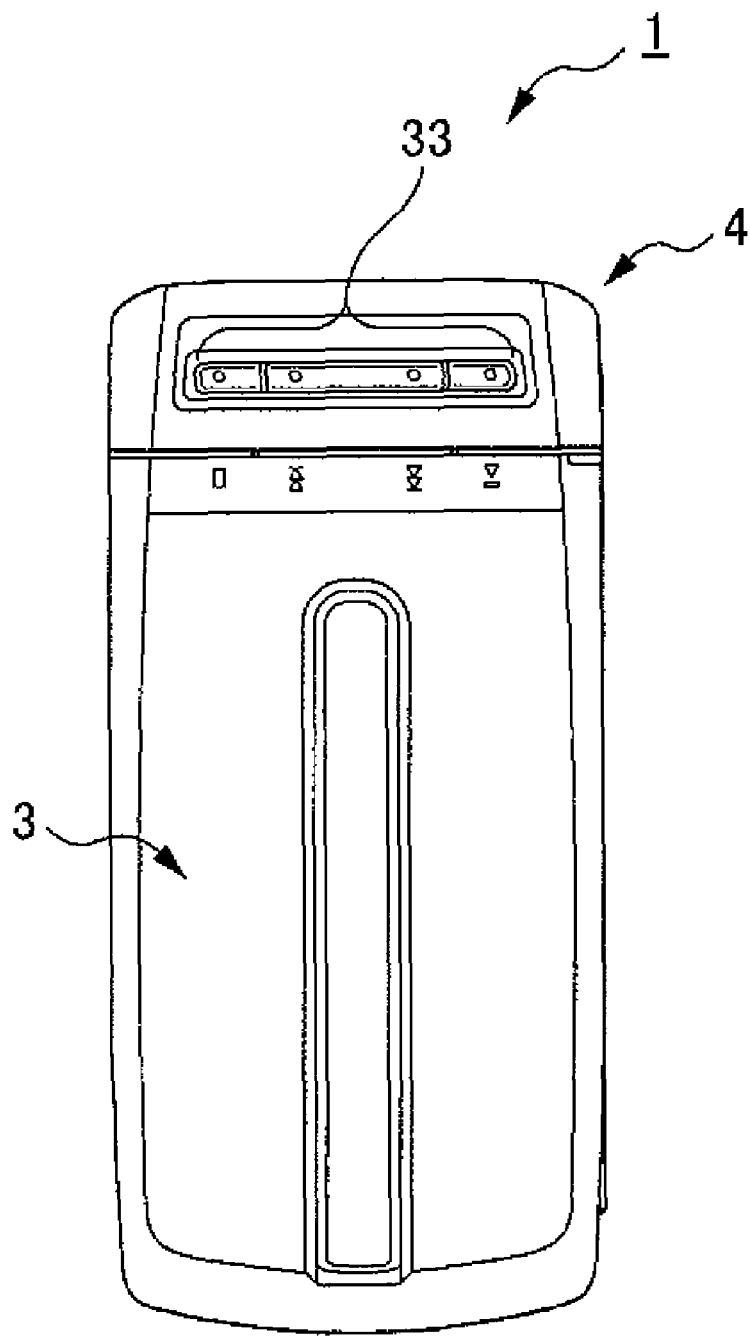
FIG. 7 is a plan view of a state (closed state) in which the display unit side housing and the operation unit side housing of the mobile terminal device according to the present invention are closed.
Figure 8:
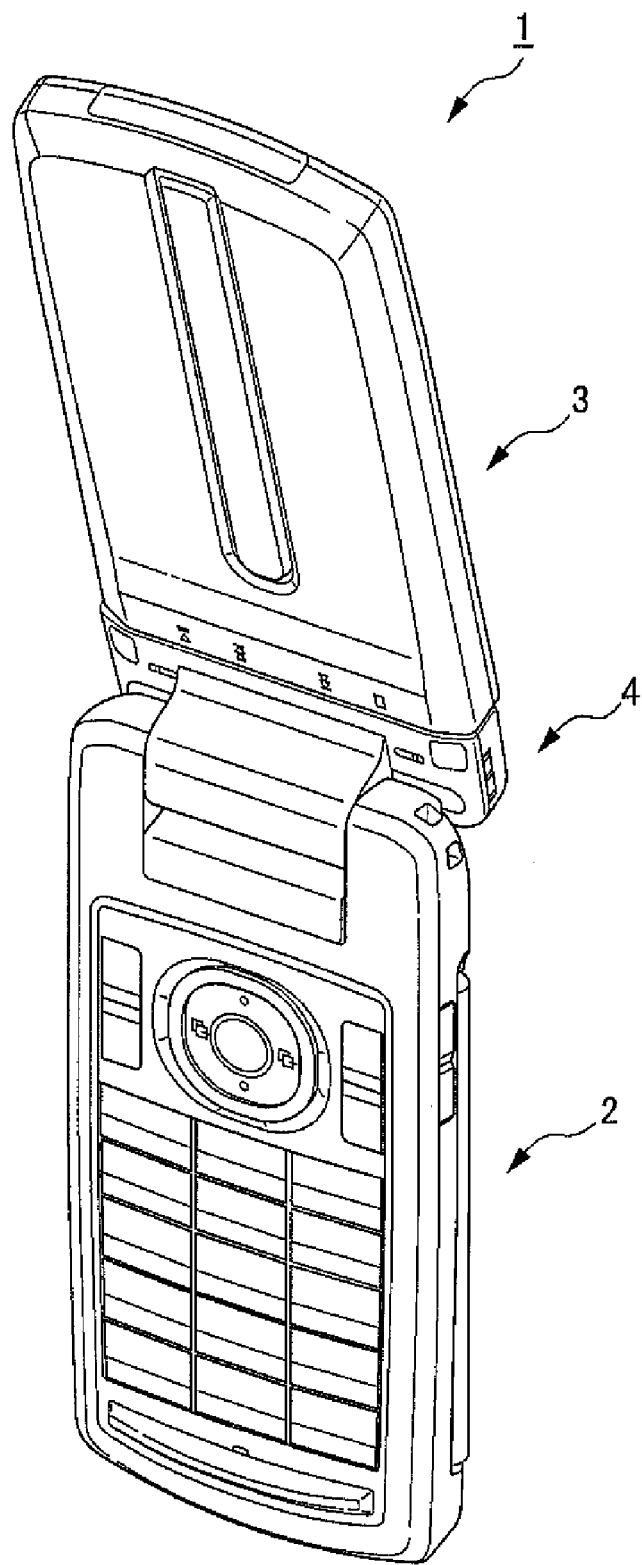
FIG. 8 is a perspective view of a state (turned state) in which the display unit side housing of the mobile terminal device according to the present invention is pivoted 180 degrees about a pivot axis of the connecting portion.
Figure 9:
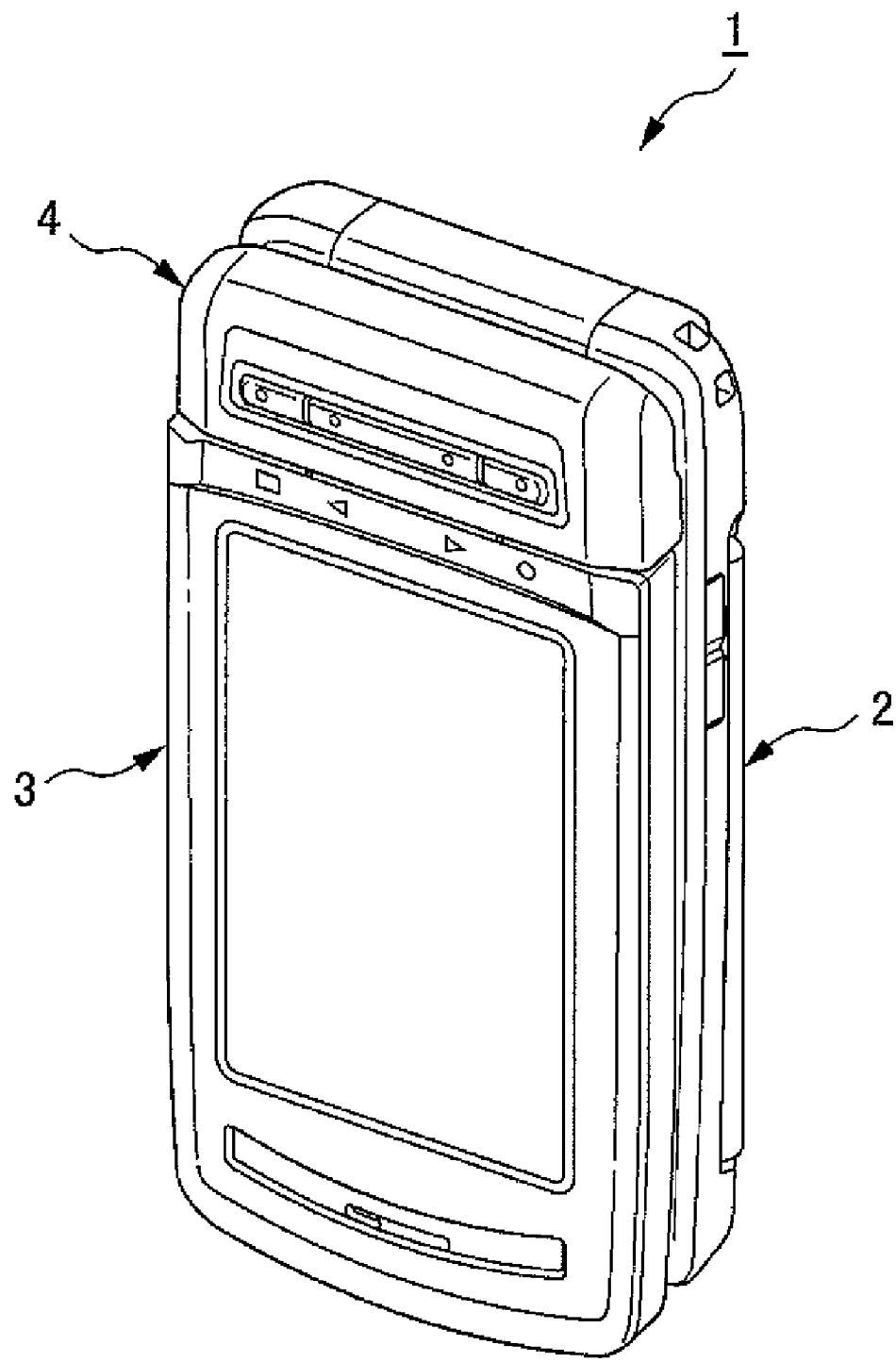
FIG. 9 is a perspective view of a state (turned-and-closed state) in which the display unit side housing shown in FIG. 8 is pivoted about an opening-and-closing axis of the connecting portion and closed.

Here, a structure and operations of the connecting portion 4 are described with reference to FIGS. 4 to 9. FIG. 4 shows a perspective view of an open state in which the mobile terminal device 1 is open. FIG. 5 shows a perspective view (FIG. 5(A)) and a lateral view (FIG. 5(B)) of a pivoting connecting member 40. FIG. 6 shows views showing an appearance when the pivoting connecting member 40 shown in FIG. 5 is fixed to a shielding case 50 and a hinge case (housing), in which FIG. 6(A) is a lateral view thereof; FIG. 6(B) is a perspective view when seen from the front panel 3a side; and FIG. 6(C) is a perspective view when seen from the rear panel 3b side. Moreover, FIG. 7 shows a plan view of a state (closed state) in which the display unit side housing 3 and the operation unit side housing 2 of the mobile terminal device 1 are pivoted to close, from the open state shown in FIG. 4, in the direction of an arrow A2 about an opening-and-closing axis A (a first pivot axis) of the connecting portion 4. FIG. 8 shows a perspective view of a state (turned-and-opened state) in which the display unit side housing 3 of the mobile terminal device 1 is pivoted 180 degrees, from the opened state shown in FIG. 4, in the direction of an arrow B2 about a pivot axis B of the connecting portion 4. FIG. 9 shows a perspective view of a state (turned-and-closed state) in which the display unit side housing 3 of the mobile terminal device 1 is pivoted to close, from the turned-and-opened state shown in FIG. 8, in the direction of an arrow A2 about the opening-and-closing axis A of the connecting portion 4.

An opening-and-closing portion 4c of a convex shape, which is formed so as to protrude perpendicularly from a surface of the connecting portion 4, is formed in one end 4a of the connecting portion 4. In the upper end portion of the operation unit side housing 2, a notch portion 2c of a concave shape is formed, into which the opening-and-closing portion 4c of a convex shape is fitted by insertion.

A hole a, which is not shown, is formed in each end of the opening-and-closing portion 4c in the opening-and-closing axis A direction. Moreover, a hole b, which is not shown, is formed in each inner surface of the notch portion 2c of the operation unit side housing 2. In a state in which the opening-and-closing portion 4c of a convex shape is fitted by insertion into the notch portion 2c of a concave shape, the hole a and the hole b are disposed so as to adjacently face each other, while an opening-and-closing connecting member of a cylindrical shape is passed through both the hole a and the hole b. The operation unit side housing 2 and the connecting portion 4 are connected by this opening-and-closing connecting member to be openable and closable. It should be noted that the opening-and-closing portion 4c is not particularly limited to a convex shape as long as the shape may be fitted by insertion into the upper end portion of the operation unit side housing 2, and the shape of the upper end portion of the operation unit side housing 2 is also not limited to a concave shape.

Moreover, another end side 4b of the connecting portion 4 and the lower end portion of the display unit side housing 3 are attached pivotally by the pivoting connecting member 40 shown in FIG. 5 to pivot freely. Holes C, which are not shown, are formed in the connecting portion 4 on a lateral side of the display unit side housing 3 side thereof. Moreover, holes D, which are not shown, are formed in the display unit side housing 3 on a lateral side of the connecting portion 4 side thereof. The operation unit side housing 2 and the connecting portion 4 are connected to be pivotable about the pivot axis B by passing a pivoting connecting member 40 through both the holes C and the holes D.

Here, a configuration of the pivoting connecting member 40 is described with reference to FIG. 5. The pivoting connecting member 40 is configured with: a first fixed portion 41 that fixes the display unit side housing 3; a second fixed portion 42 that is fixed to the hinge case; and a pivoting portion 43 that connects the first fixed portion 41 and the second fixed portion 42 so as to pivot freely about the pivot axis B (a second pivot axis) at arbitrary angles.

Moreover, as shown in FIG. 5, an end portion of the first fixed portion 41 is formed perpendicularly in relation to a flat surface that is orthogonal to the pivot axis B. Moreover, as shown in FIG. 5, an end portion of the second fixed portion 42 is formed at a predetermined angle greater than 90 degrees in relation to a flat surface that is orthogonal to the pivot axis B. Here, the predetermined angle is determined by considering an unexpected angle caused between the connecting portion 4 and the display unit side housing 3 due to an assembly error arising at during manufacturing, and, in the present embodiment, is greater than 90 degrees and smaller than 95 degrees, is preferably an angle in the range of 90.5 degrees to 92.5 degrees, and is more preferably an angle of 91 degrees.

Next, an appearance when the pivoting connecting member 40 is connected to the display unit side housing 3 is shown with reference to FIG. 6. The end portion of the first fixed portion 41 of the pivoting connecting member 40 is fixed to an end portion of the shielding case 50 configuring the display unit side housing 3. Moreover, as described above, since the end portion of the first fixed portion 41 is formed perpendicularly to a flat surface that is orthogonal to the pivot axis B, the shielding case 50, which is fixed to the end portion of the first fixed portion 41, is also perpendicular in relation to the flat surface that is orthogonal to the pivot axis B.

In this way, in the mobile terminal device 1, the end portion of the first fixed portion 41 is formed perpendicularly in relation to the flat surface that is orthogonal to the pivot axis B, and the end portion of the second fixed portion 42 is formed at the predetermined angle greater than 90 degrees in relation the flat surface that is orthogonal to the pivot axis B; therefore, in a case in which the operation unit side housing 2 and the display unit side housing 3 are in the closed state (state shown in FIG. 7) or the turned-and-closed state (state shown in FIG. 9) by closing about the opening-and-closing axis A, the edge of the display unit side housing 3 is always in a state that is inclined so as to abut the edge of the operation unit side housing 2 with the opening-and-closing axis A as a basis. Therefore, since the mobile terminal device 1 has a structure in which the edge of the display unit side housing 3 and the edge of the operation unit side housing 2 are not separated with a space caused by play even if there is an assembly error that arises during manufacturing, it possible to hold the edge of the display unit side housing 3 and the edge of the operation unit side housing 2 tightly to suppress rattling.

Moreover, as shown in FIG. 4, in the mobile terminal device 1, the first convex portion 26 is formed on an end portion of a front surface of the operation unit side housing 2 on a side thereof that is not connected to the connecting portion 4. In a case in which the operation unit side housing 2 and the display unit side housing 3 are in the closed state (state shown in FIG. 7) or the turned-and-closed state (state shown in FIG. 9) by closing about the opening-and-closing axis A, the first convex portion 26 abuts the front surface of the end portion of the display unit side housing 3, and holds thereof. It should be noted that the first convex portion 26 is not limited to being formed on the front surface of the end portion of the operation unit side housing 2, and may be formed on the front surface of the end portion of the display unit side housing 3, or may be formed on the front surfaces of both end portions. That is to say, the first convex portion 26 restricts movement of the operation unit side housing 2 and the display unit side housing 3 at least in the opening-and-closing axis A direction.

Moreover, as shown in FIG. 4, in the mobile terminal device 1, the second convex portion 27 is formed on a front surface of the end portion of the operation unit side housing 2 on a side that is connected to the connecting portion 4. In a case in which the operation unit side housing 2 and the display unit side housing 3 are in the closed state (state shown in FIG. 7) or the turned-and-closed state (state shown in FIG. 9) by closing about the opening-and-closing axis A, the second convex portion 27 abuts a portion of connecting the connecting portion 4 and the display unit side housing 3, and holds thereof. It should be noted that the second convex portion 27 is not limited to being formed on the front surface of the end portion of the operation unit side housing 2, and may be formed on the front surface of the end portion of the display unit side housing 3, or may be formed on the front surfaces of both end portions. That is to say, the second convex portion 27 restricts movement of the operation unit side housing 2, and the connecting portion 4 and the display unit side housing 3 at least in the opening-and-closing axis A direction.

Moreover, the first convex portion 26 and the second convex portion 27 are formed of a material having elasticity such as a rubber material or an elastomeric material.

Description of Operations

Next, operations of the connecting portion 4 are described. As described above, since the operation unit side housing 2 and the display unit side housing 3 are connected by the connecting portion 4, the mobile terminal device 1 can be transformed into various states by a relative opening/closing operation to pivot about the opening-and-closing axis A and by a pivoting operation about the pivot axis B.

For example, the mobile terminal device 1 can be put into a state (the ordinary opened state) in which the operation unit side housing 2 and the display unit side housing 3 are mutually opened by a relative opening operation about the opening-and-closing axis A in the direction of the arrow A1.

Moreover, the mobile terminal device 1 can be put into a state (the ordinary closed state) in which the operation unit side housing 2 and the display unit side housing 3 are folded by a relative closing operation about the opening-and-closing axis A in the direction of the arrow A2 (see FIG. 7).

In addition, the mobile terminal device 1 can be put into a state (the turned-and-closed state) that is folded while the front panel 3a of the display unit side housing 3 is exposed to the outside, by pivoting the display unit side housing 3 in the opened state 180 degrees about the pivot axis B in the direction of the arrow B2, and performing the closing operation on the display, unit side housing 3 to pivot in the direction of the arrow A2 about the opening-and-closing axis A, to make a closed state (see FIG. 9).

The operation unit side housing 2 is provided with: the front panel 2a; a key sheet that configures the operation key set 11; a flexible printed-circuit board for key switches; the shielding case; a circuit board including various electronic components such a reference potential pattern layer and an RF (Radio Frequency) module for a mobile terminal device; an antenna portion; the rear panel 2b; the battery; and the battery lid 25. Moreover, the battery is accommodated to be detachable from the outside of the rear panel 2b.

Moreover, the front panel 2a and the rear panel 2b are disposed such that concave inner surfaces thereof face each other, and are connected such that peripheries thereof superimpose each other. In addition, the key sheet, the flexible printed-circuit board, the shielding case, the circuit board and the antenna portion are configured in this order between the front panel 2a and the rear panel 2b. In other words, the shielding case is disposed to be layered so as to cover the flexible printed-circuit board, and the key sheet is disposed to be layered on the top face of the flexible printed-circuit board.

A plurality of key holes are formed on the inner surface of the front panel 2a, which is opposed to the display 30 of the display unit side housing 3 in a state in which the mobile terminal device 1 is folded. Depression faces of the function setting operation keys 13, the input operation keys 14 and the selection keys 15a are exposed from the plurality of key holes, respectively. By pushing so as to depress a depression face of the function setting operation keys 13, the input operation keys 14 and the selection keys 15a, which constitute the exposed operation key set 11, an apex of a metal dome (a bowl shape) in the corresponding key switch is depressed, thereby contacting a switch terminal and establishing electrical conduction.

Moreover, the display unit side housing 3 is provided with: the front panel 3a; a display unit; the shielding case 50; a circuit board including a reference potential patterned layer and electronic components for a display; a sub-display unit; and the rear panel 3b.

The front panel 3a and the rear panel 3b are disposed such that concave inner surfaces thereof face each other, and are connected such that peripheries thereof superimpose each other. Moreover, the display unit, the shielding case 50, the circuit board and the sub-display unit are disposed to be accommodated in this order from the front panel 3a side, between the front panel 3a and the rear panel 3b.

Moreover, the shielding case 50 has a cross section that is an H shaped member, and an accommodating portion of a shallow concave shape that is formed in the front panel 3a side and the rear panel 3b side. The display unit is disposed to be accommodated on the front panel 3a side of the shielding case 50, and the circuit board is disposed to be accommodated on the rear panel 3b side. Here, the shielding case 50 functions as a reinforcing member for maintaining rigidity against a bending motion and a twisting motion in the display unit side housing 3, and as electrostatic shielding.

In this way, in the mobile terminal device 1, the end portion of the first fixed portion 41 is formed perpendicularly in relation to the flat surface that is orthogonal to the pivot axis B, and the end portion of the second fixed portion 42 is formed at a predetermined angle greater than 90 degrees in relation to the flat surface that is orthogonal to the pivot axis B; therefore, in a case in which the operation unit side housing 2 and the display unit side housing 3 are in the closed state (state shown in FIG. 7) or the turned-and-closed state (state shown in FIG. 9) by closing about the opening-and-closing axis A, the edge of the display unit side housing 3 is always in a state that is inclined so as to abut the edge of the operation unit side housing 2 with the opening-and-closing axis A as a basis, and since the edge of the display unit side housing 3 and the edge of the operation unit side housing 2 are not separated with a space caused by structural play, the display unit side housing 3 and the operation unit side housing 2 can be held tightly without causing rattling.

Moreover, in the mobile terminal device 1, since the first convex portion 26 and the second convex portion 27 are further formed on the front surface of the end portions of the operation unit side housing 2, the operation unit side housing 2 and the display unit side housing 3 can be held tightly without causing rattling therebetween, by way of the first convex portion 26 and the second convex portion 27.

Furthermore, in the mobile terminal device 1, in a case in which the operation unit side housing 2 and the display unit side housing 3 are in the closed state (state shown in FIG. 7) or the turned-and-closed state (state shown in FIG. 9) by closing about the opening-and-closing axis A, depressing operations of the secondary operation key set 33 disposed on the rear surface side of the connecting portion 4, and touching operations of the display of the display unit side housing 3 with a pen and the like for example can be performed easily without applying an undue force.

In addition, in the mobile terminal device 1, in a case in which the operation unit side housing 2 and the display unit side housing 3 are in the closed state (state shown in FIG. 7) or the turned-and-closed state (state shown in FIG. 9) by closing about the opening-and-closing axis A, since the operation key set 11 does not contact with the surface of the display unit side housing 3 facing thereto because of the first convex portion 26 and the second convex portion 27, the display 30 is not damaged in the closed state, and the sub-display 32 is not damaged in the turned-and-closed state.

Moreover, as long as the mobile terminal device 1 has a structure in which the operation unit side housing 2 and the display unit side housing 3 can be held without rattling when in the closed state (state shown in FIG. 7) or the turned-and-closed state (state shown in FIG. 9), the position, size and range for forming the first convex portion 26 and the second convex portion 27 are not limited to the present embodiment.

The invention claimed is:

1. An electronic equipment comprising:
   a first housing;
   a second housing that is provided to pivot freely about a first pivot axis in relation to the first housing; and
   a third housing, which is provided to pivot freely about a second pivot axis that is substantially orthogonal to the first pivot axis in relation to the second housing, and which takes a state facing and a state not facing the first housing, wherein
   in a case in which the third housing is in a state facing the first housing, the third housing is configured so as to have a flat surface, which is orthogonal to the second axis, and which makes a predetermined angle in relation to a flat surface of the first housing that faces the third housing so that the third housing tilts in relation to the first housing.

2. The electronic equipment according to claim 1, wherein the second pivot axis tilts in relation to the second housing.

3. The electronic equipment according to claim 1 or 2,
   wherein a second holding portion is formed on the first housing in the vicinity of a connecting portion thereof to the second housing,
   and wherein, in a case in which the third housing is in a state facing the first housing about the first pivot axis, a portion of connecting the second housing and the third housing is held by the second holding portion.

4. The electronic equipment according to claim 3, wherein the second holding portion is a convex portion.

5. The electronic equipment according to claim 3, wherein the second holding portion restricts movement of the first housing and the second housing at least in a direction substantially parallel to the first pivot axis.

6. The electronic equipment according to claim 1,
   wherein a first holding portion is formed on one or both of an edge of the first housing and an edge of the third housing that are not connected to the second housing,
   and wherein in a case in which the third housing is in a state facing the first housing about the first pivot axis, the edge of the first housing and the edge of the third housing are held by the first holding portion.

7. The electronic equipment according to claim 6, wherein the first holding portion is a convex portion.

8. The electronic equipment according to claim 6, wherein the first holding portion restricts movement of the first housing and the third housing at least in a direction substantially parallel to the first pivot axis.

9. The electronic equipment according to claim 1, wherein the predetermined angle is an angle greater than 90 degrees.

* * * * *